(12) United States Patent
Mätlik

(10) Patent No.: US 9,776,252 B2
(45) Date of Patent: Oct. 3, 2017

(54) CHUCK

(71) Applicant: SANDVIK INTELLECTUAL PROPERTY AB, Sandviken (SE)

(72) Inventor: Gunnar Mätlik, Gavle (SE)

(73) Assignee: SANDVIK INTELLECTUAL PROPERTY AB, Sandviken (SE)

(*) Notice: Subject to any disclaimer, the term of this patent is extended or adjusted under 35 U.S.C. 154(b) by 0 days.

(21) Appl. No.: 14/578,287

(22) Filed: Dec. 19, 2014

(65) Prior Publication Data

US 2015/0174666 A1 Jun. 25, 2015

(30) Foreign Application Priority Data

Dec. 20, 2013 (EP) ..................................... 13199132

(51) Int. Cl.
*B23B 31/00* (2006.01)
*B23B 31/11* (2006.01)
(Continued)

(52) U.S. Cl.
CPC ............ *B23B 31/10* (2013.01); *B23B 31/005* (2013.01); *B23B 31/008* (2013.01);
(Continued)

(58) Field of Classification Search
CPC ... B23B 31/305; B23B 31/008; B23B 31/028; B23B 31/1115; B23B 31/1107;
(Continued)

(56) References Cited

U.S. PATENT DOCUMENTS 1,775,992 A * 9/1930 Emrick ................. B23B 31/008
279/137
2,379,984 A 7/1945 Joseph
(Continued)

FOREIGN PATENT DOCUMENTS

DE 8518206 U1 8/1985
DE 8816032 U1 3/1989

*Primary Examiner* — Eric A Gates
*Assistant Examiner* — Chwen-Wei Su
(74) *Attorney, Agent, or Firm* — Corinne R. Gorski

(57) ABSTRACT

A rotatable chuck for clamping a shank portion of a rotatably operating machining tool includes a rotatable chuck body provided with a cylindrical bore concentric with a rotation axis of the chuck body. The circumferential surfaces of a clamping portion of the bore are arranged to apply a clamping force around the circumference of the shank portion of the tool when it is mounted in the chuck to fixate the tool in the chuck. The chuck is provided with auxiliary pull out preventing means for preventing inadvertent pull out of the tool in the axial direction of the bore during machining operation, as well as auxiliary rotary preventing means for preventing inadvertent rotation in at least one direction in relation to the chuck during machining operation. The auxiliary pull out and rotary preventing means include an attachment member positionable in an inner portion of the bore and attachable to the shank portion to be clamped, such that the tool and the attachment member will be prevented from being pulled apart in the axial direction and from being rotated in at least one direction in relation to each other.

6 Claims, 9 Drawing Sheets

(51) Int. Cl.
*B23B 31/10* (2006.01)
*B23B 31/02* (2006.01)
*B23B 31/30* (2006.01)

(52) U.S. Cl.
CPC .......... *B23B 31/028* (2013.01); *B23B 31/305* (2013.01); *B23B 31/11* (2013.01); *B23B 31/1115* (2013.01); *B23B 2231/00* (2013.01); *B23B 2231/0264* (2013.01); *B23B 2240/04* (2013.01); *B23B 2260/0482* (2013.01); *B23B 2260/056* (2013.01); *B23B 2260/1381* (2013.01); *B23B 2270/60* (2013.01); *Y10T 279/1241* (2015.01); *Y10T 279/15* (2015.01); *Y10T 279/16* (2015.01); *Y10T 279/17* (2015.01); *Y10T 279/3487* (2015.01)

(58) Field of Classification Search
CPC ............. B23B 31/11; B23B 2231/0264; B23B 2260/056; B23B 2260/0482; B23B 2260/1381; B23B 2270/60; Y10T 279/1216; Y10T 279/1241; Y10T 279/15; Y10T 279/16; Y10T 279/3487

See application file for complete search history.

(56) References Cited

U.S. PATENT DOCUMENTS

| 3,171,666 | A | 3/1965 | Benjamin et al. | |
|---|---|---|---|---|
| 4,964,762 | A * | 10/1990 | Arai | B23B 31/008 407/34 |
| 8,505,893 | B2 | 8/2013 | Haimer | |
| 2004/0084855 | A1 | 5/2004 | Stenson | |
| 2005/0089382 | A1 * | 4/2005 | Stojanovski | B23B 31/1107 409/234 |
| 2006/0072977 | A1 | 4/2006 | Jonsson et al. | |
| 2013/0001896 | A1 | 1/2013 | Herud | |
| 2013/0127123 | A1 * | 5/2013 | Miyanaga | B23B 31/1107 279/76 |
| 2014/0227057 | A1 * | 8/2014 | Haimer | B23B 31/008 409/234 |
| 2014/0234035 | A1 * | 8/2014 | Azegami | B23C 5/10 407/34 |

* cited by examiner

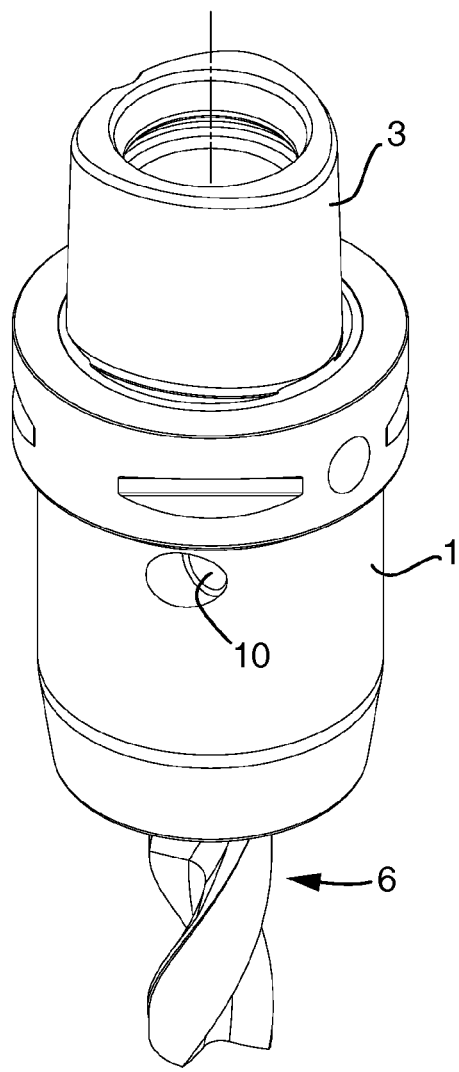
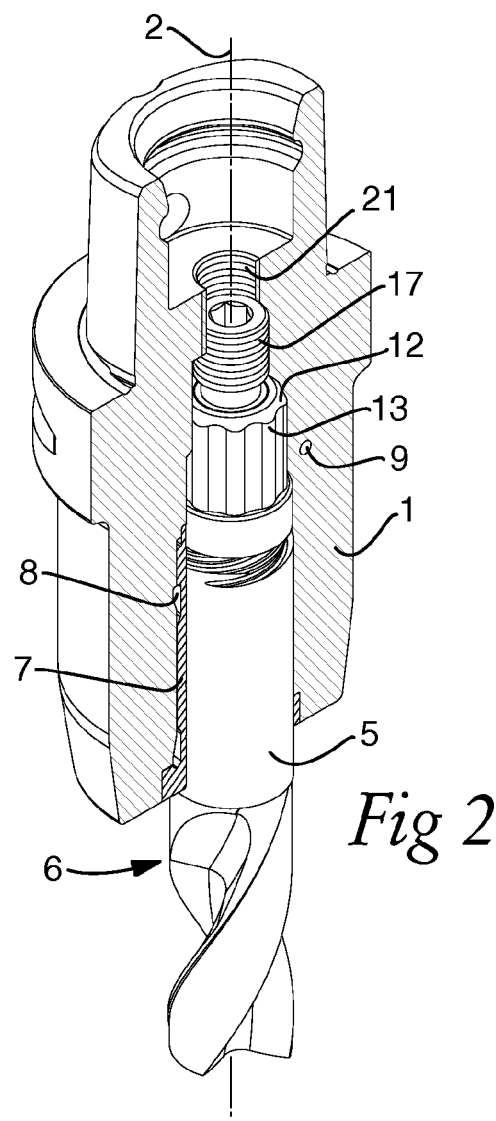
Fig 1
Fig 2

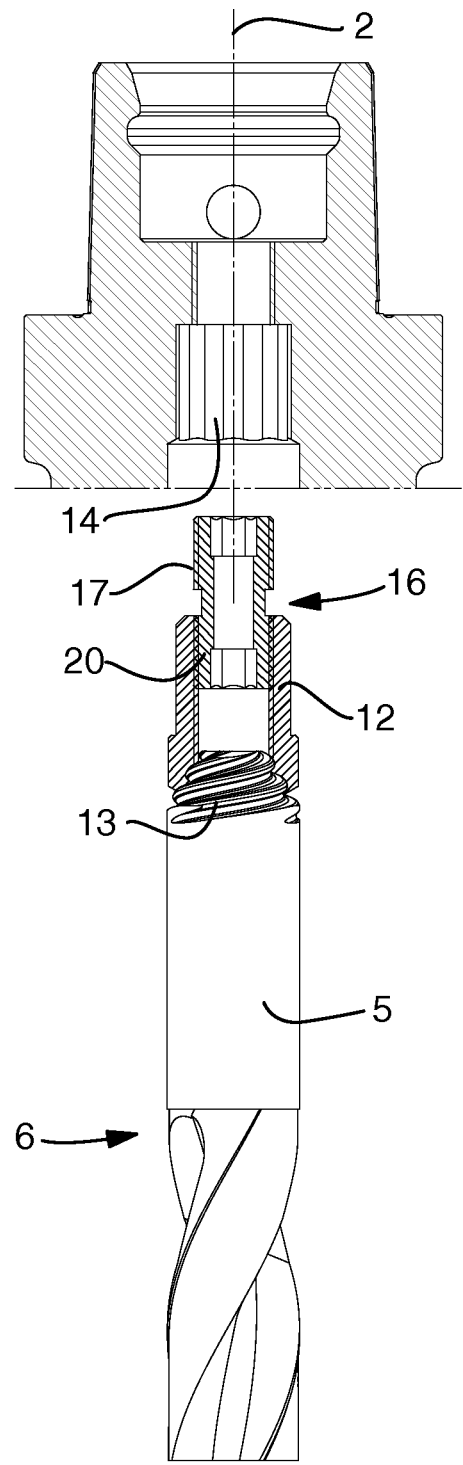

CHUCK

TECHNICAL FIELD

The present disclosure relates to a rotatable chuck for clamping a shank portion of a rotatably operating machining tool.

BACKGROUND

Chucks for clamping a shank portion of a rotatable machining tool, such as a milling cutter or a drill, are well known within the machining industry, especially for machining work pieces of steel or other metals, but also for wood and plastics. Such a chuck is in its turn mounted in a suitably designed machine for rotatably driving of the chuck. Usually, the attachment of the tool is accomplished purely by frictional clamping, such that clamping surfaces within a clamping bore of the chuck are tightened around the shank portion. The clamping force can be generated in different ways, such as mechanical displacement of clamping jaws inside the clamping bore, hydraulic deflection of a clamping insert or collet inside the clamping bore or thermal crimping of the chuck body around the shank portion.

One problem with a purely frictional clamping of the shank portion of the machining tool is that, despite applying a maximal possible clamping force, the machining tool may during operation tend to rotate and/or be displaced in the axial direction in relation to the chuck. The reason for this is usually to be found in the combination of the vibrations to which the machining tool is exposed during the machining operation, especially when the machining is performed at high rotational speed, and the tangential and axial forces acting on the tool during operation.

The above problem can be overcome by a frictional clamping chuck and a milling cutter as disclosed in U.S. Pat. No. 8,505,893, in which the inner end portion of the milling cutter is provided with helical or L-shaped locking grooves, which are adapted to engage with balls or pin-shaped locking elements. In an alternative embodiment in that document, the circumferential surface at the inner end portion of the shank of the machining tool is provided with a male thread, which is in engagement with a female thread in the inner portion of the bore. With a chuck formed in this way, the machining tool will, due to the locking grooves or threads, be prevented from rotation, in at least one direction, as well as be prevented from being pulled out in the axial direction from the bore.

However, there are also several drawbacks with a chuck and machining tool designed as in U.S. Pat. No. 8,505,893. Since the envelope surface of the tool shank is provided with some kind of threads or locking grooves, the clamping zone between the chuck and the tool will be negatively affected in one way or the other. For example the clamping portion of a hydraulic expansion chuck is not well suited to clamping around threads or grooves, since this could cause permanent deformation of the hydraulically deflectable sleeve inside the chuck. Also, the ball- or pin-shaped locking elements cannot be allowed to penetrate through the channels and spaces for hydraulic fluid between the deflectable collet and the chuck body, nor can a female thread be formed in the deflectable collet. Accordingly, in this case the clamping portion of the chuck has to be made shorter, which will render the frictional clamping forces acting on the tool lower, or alternatively to make the tool shank and the chuck bore longer, which will increase the quantity of material for manufacturing the tool, and hence increase the costs, and take up more space inside the chuck, which accordingly also has to be made longer.

For a mechanically operated draw-in collet chuck, the ball- or pin-shaped locking elements will complicate the design and disturb the function of the clamping jaws and a female thread cannot be formed in the clamping jaws. Accordingly, the clamping zone between the clamping jaws and the tool shank will be reduced due to the threads or locking grooves with lowered frictional clamping force as a result, unless this is compensated by an extended tool shank and chuck bore. Also, in case of a thermal expansion chuck the thread or the locking grooves may reduce the frictional clamping force, which may have to be compensated by an extended tool shank and chuck bore. Moreover, should the machining tool break such that only the tool shank is left inside the chuck bore, the remaining tool shank is very difficult to remove from the chuck bore.

In addition to the above mentioned drawbacks, the embodiment having a male thread on the envelope surface of the tool shank and a female thread inside the chuck bore will be difficult and hence costly to produce, since the female thread has to be shaped in the bottom of a rather narrow bore.

SUMMARY

An aspect of the present disclosure is to provide a rotatable chuck, which in addition to being able to fasten a rotatable operating machining tool by applying a frictional clamping force around a shank portion of the tool, can in a simple and reliable way, lock the tool in the chuck against rotation in at least one direction, as well as against pull out from the chuck in its axial direction, and also to release the tool from the chuck. At least this aspect is achieved by a chuck having a rotatable chuck body provided with a cylindrical bore being concentric with a rotation axis of the rotatable chuck body, wherein circumferential surfaces of a clamping portion of the bore are arranged to apply a clamping force around the circumference of the shank portion of the tool when it is mounted in the chuck to fixate the tool in a well-defined position in the chuck, and wherein the chuck also is provided with auxiliary pull out preventing means, for preventing inadvertent pull out of the tool in the axial direction of the bore during machining operation, as well as auxiliary rotary preventing means for preventing inadvertent rotation in at least one direction in relation to the chuck during machining operation.

Accordingly, this aspect may be achieved by a chuck including an attachment member positionable in an inner portion of the bore and attachable to the shank portion to be clamped such that the tool and the attachment member will be prevented from being pulled apart in the axial direction, as well as be prevented from being rotated in at least one direction in relation to each other. The rotatable chuck body also has an axial pull out preventing means, as well as a rotary preventing means in at least one direction arranged to engage with the attachment member. There are several advantages with arranging the pull out and rotary preventing of the machining tool by an auxiliary attachment member. For example, in case it is desirable to change the rotary direction of the tool, only the tool and the attachment member need to be exchanged without the need for exchanging the entire chuck body. Also, in case the machining tool should break, such that only the tool shank is left inside the chuck bore, it is easy to release the remaining tool shank by releasing the attachment member from the chuck body.

Within this overall aspect, a chuck according may be formed in many different ways. For example, in the hereinafter described and illustrated embodiments, the engagement coupling between the tool shank and the attachment member is formed as a conical thread or a bayonet coupling, by which the male parts of the conical thread and the bayonet coupling are formed in the end of the shank portion, whereas the female parts are formed in the attachment member. However, it is to be understood that many other types of engagement couplings could be conceivable. For example, to form the threads as ordinary straight threads on a shank portion having a uniform cross-section or to form the male parts of the threads or the bayonet coupling in the attachment member and the female parts in the shank portion.

Also, the bayonet coupling could be formed in many different ways, e.g. as projecting pins in one of the attachment member or the shank portion which are adapted to go into engagement within grooves formed in the other. One advantage with an engagement coupling in form of a conical thread or a bayonet coupling is that the tool and the attachment member can be attached with or released from each other by means of just a short rotation of the tool, normally in order of just a quarter to a half of a full turn, which makes the attachment easy and quick. A straight thread, on the other hand, requires a larger rotation, at least one full turn and normally several full turns.

Both the conical thread and the bayonet coupling, as disclosed herein, provide a connection which prevents pull out of the tool shank in the axial direction from the attachment member, as well as rotation of the tool shank in one direction in relation to the attachment member. However, a bayonet coupling could also be designed to prevent the tool shank from being rotated in both directions, e.g. by a spring biasing of the bayonet coupling such that the attachment member and the shank portion are pushed in a direction away from each other and a projecting portion of the bayonet coupling at either the attachment member or the shank is pushed into a recess in the other.

Also, the attachment member and the chuck body are each provided with axial pull out preventing means, as well as rotary preventing means, which are arranged to interact to enable connecting the attachment member and the chuck body together in an axial pull out preventing and rotary preventing way.

In a hereinafter described and illustrated first embodiment, the rotary preventing means are in form of splines in the axial direction on the outside of the attachment member and mating internal splines inside a mounting portion inward of the chuck bore which are arranged to interact with each other in order to secure the attachment member against rotation in both directions.

It is to be understood however, that the rotary preventing means for the attachment member could be made in many different ways, for example, as a single ridge in a single groove or as twisted splines having an angle in relation to the axial direction. The pull out preventing means are in form of a screw having external threads, which are arranged to rotatably engage with mating internal threads inside the chuck body, as well inside a hole in the attachment member in order to secure them together in the axial direction.

In a second embodiment, the attachment member is formed with a yoke, having two yoke shanks at its inner end portion. The yoke shanks are, along their inner surfaces, provided with diagonally oppositely directed grooves. Two locking rods, which are adjustably telescoping interconnected and accommodated in a hole transverse to the axial direction of the chuck, are extended through the space between the yoke shanks. The locking rods are provided with guide surfaces having diagonally oppositely directed ridges, which mate with and are in engagement with the diagonally oppositely directed grooves in the yoke shanks of the attachment member. Accordingly, the locking rods and the attachment member interact by means of the diagonally oppositely directed grooves and ridges, as well as by the yoke shanks to prevent pull out of the attachment member in the axial direction and rotation in both directions. The more precise function of the interaction between the attachment member and the locking rods will be described in relation to the detailed description of the exemplary embodiment.

In a further aspect, the projecting of the tool from a chuck having an attachment member can be readily adjusted. According to this aspect, there is provided a chuck in which the position of the attachment member is continuously adjustably displaceable and lockable in different positions within the chuck body. A great advantage with a chuck designed in this way is that the machining depth of the machining tool can be carefully regulated for high quality precision machining.

Although both of the hereinafter described and illustrated embodiments relate to hydraulically operated clamping chucks, it is to be understood that the invention is applicable on all types of clamping chucks, such as mechanically and thermally operated clamping chucks.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIG. 1 is a perspective view of a chuck according to a first embodiment which carries a shank end mill.

FIG. 2 is a perspective longitudinal cross-section of the chuck according to FIG. 1.

FIG. 5 is a partly exploded and longitudinal cross-section through a portion of the chuck, illustrating the regulating mechanism for regulating the projection of the shank end mill from the chuck.

DETAILED DESCRIPTION OF THE EMBODIMENTS

Figure 3:
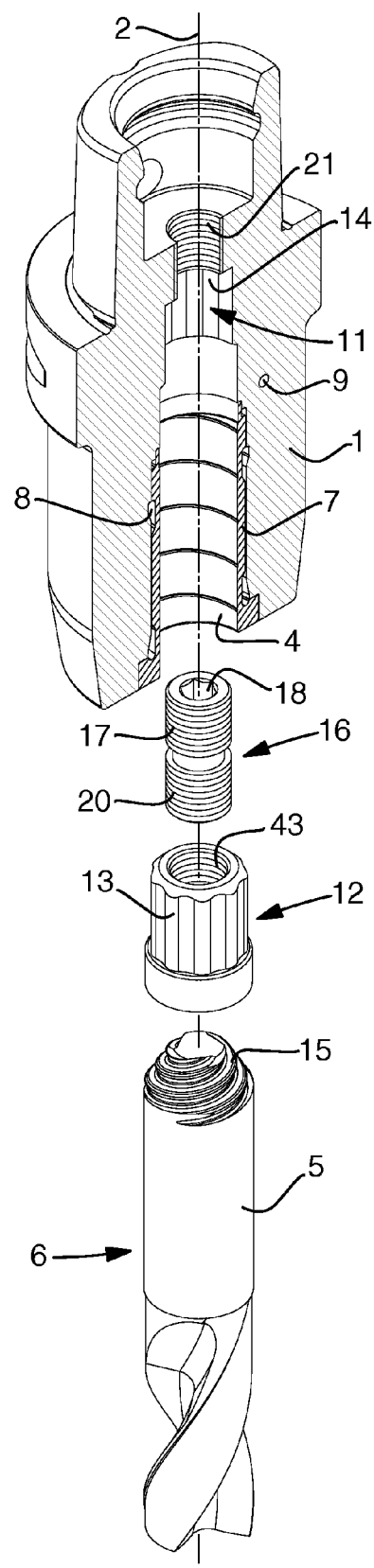
FIG. 3 is an exploded perspective view of the chuck in FIG. 2.

It is to be noted that the terms inner, inward and the like as used herein throughout the specification and claims, refers to a direction as seen from the mouth of the chuck bore along the rotary axis of the chuck body. The terms outer, outward and the like, refers accordingly to the opposite direction.

Referring to FIGS. 1-5, a first embodiment of a chuck will be described. The chuck includes a general rotationally symmetric chuck body 1 of a generally homogenous metal material, which is rotatable around a rotation axis 2. The chuck body has one end formed with an attachment portion 3, which in the embodiments shown herein is in form of a tapered, non-circular shaft of a commonly known type arranged to be secured to a mating motor-driven spindle (not shown) of a working machine. At the opposite end the chuck body is provided with a circular cylindrical chuck bore 4, which is arranged to receive and clamp a shank 5 of a machining tool 6. A shank of a machining tool in form of a shank end mill is shown inserted into the chuck bore of the various drawings.

Figures 4A, 4B:
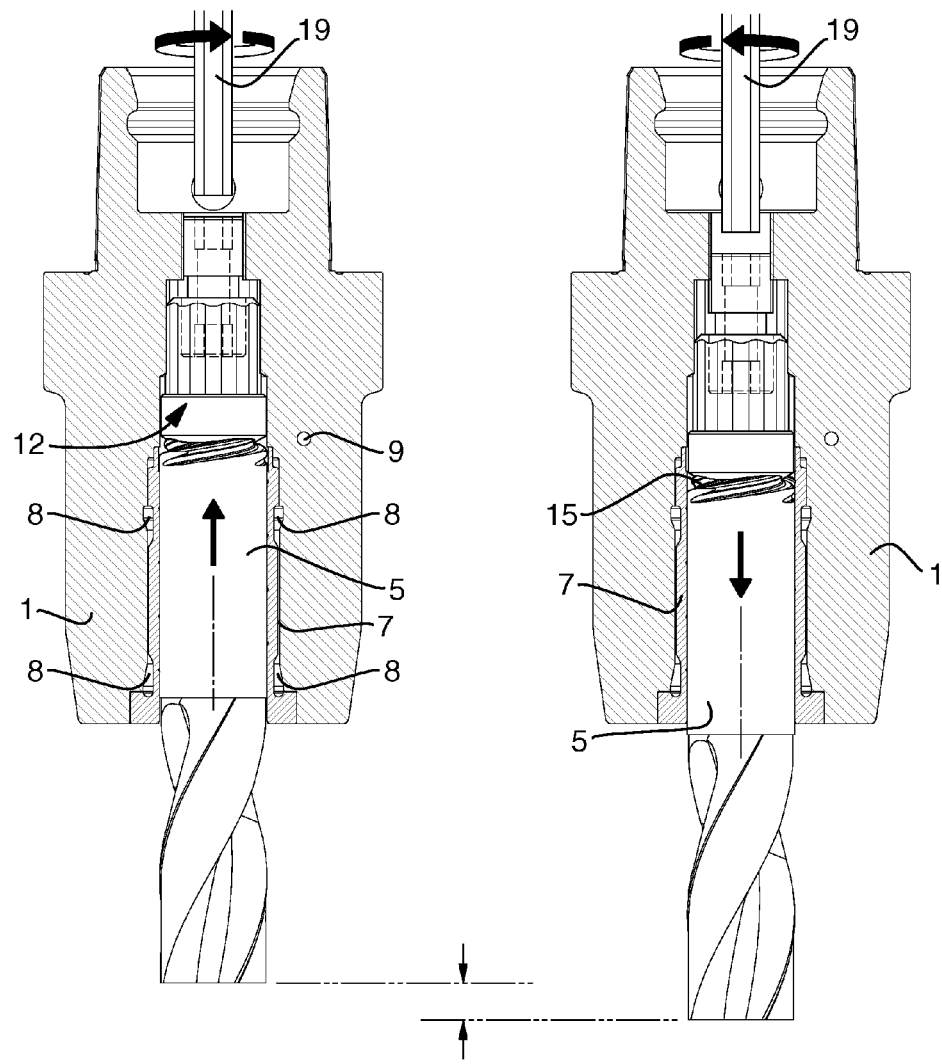
FIGS. 4a-4b are longitudinal cross-sections of the chuck according to FIGS. 1-3 showing the shank end mill in two different projecting positions.

The chuck is of the kind which clamps the tool shank by hydraulic pressure. For this purpose, the chuck is provided with a hydraulic clamping element in the form of a rather thin-walled clamping collet 7 inserted into the chuck bore, as is best seen in FIGS. 4a-b. In a way known per se, the collet is at least at its ends connected to the chuck body 1 in a fluid- and gas-tight fashion, e.g. by soldering. The intermediate portion of the collet between its ends is disengaged from the chuck body and fluid channels 8 for the hydraulic fluid are arranged in the area between the collet 7 and the chuck body 1 into which pressurized hydraulic fluid may be fed through a hydraulic supply channel 9 from a pressure generating means (not shown), which for example can be formed as a hydraulic piston controllable by means of a screw or the like, which are positioned inside of a hole 10 in the chuck body 1, as is shown e.g. in FIGS. 1 and 6. When pressurized hydraulic fluid is forced into the space between the collet 7 and the chuck body 1, the collet will tend to deflect inwards and accordingly clamp around the tool shank 5.

According to the present disclosure, the chuck is provided with an attachment member, which is positionable in a mounting portion 11 located at an inner end of the chuck bore 4. In a first embodiment, illustrated in FIGS. 1-5, the attachment member is formed as a sleeve 12 having a generally circular cross-section. The envelope surface of the sleeve is formed with splines 13 having grooves and ridges in the axial direction. The mounting portion 11 has a generally circular cross-section and is formed with splines 14 having grooves and ridges in the axial direction around its circumference, which mate with the splines 13 of the sleeve 12 such that the sleeve can be inserted with a snug fit within the mounting portion 11. Accordingly, when the sleeve 12 is positioned within the mounting portion it will be prevented from rotating, but will be displaceable in the axial direction. Preferably, the grooves of the splines on the circumference of the mounting portion may have a part-circular shape in cross-section. With grooves shaped in this way, they can easily be machined by means of a shank end mill, which is beneficial because of the limited space at the end of the chuck bore. Accordingly, it is also preferred that also the ridges of the splines at the attachment member have a part-circular shape in cross-section.

In the first embodiment, the machining tool 6 in form of a shank end mill, is attachable to the sleeve shaped attachment member 12 by means of a conical shaped male thread 15 formed in the end of the tool shank 5, which can be threaded into a mating conical female thread in the outer end of the sleeve. This is best illustrated in FIGS. 3 and 5. When the tool 6 is threaded into engagement with the attachment member 12, the tool will be prevented from being pulled apart in the axial direction from the attachment member and will also be prevented from being rotated in one direction in relation to the attachment member.

The attachment member 12 is in turn attachable to the chuck body 1 by means of a double-threaded regulating screw 16, as shown in FIG. 3, having a right-hand thread 17 in one end portion, which end is also formed with a suitable engagement formation, e.g. in form of an Allen aperture 18, for engagement and rotation by means of a tool, e.g. an Allen key 19. The other end portion of the regulating screw is formed with a left-hand thread 20. The right-hand thread 17 can be threaded into a matching right-hand female thread in a hole 21 inside the chuck body at the inner end of the mounting portion for the attachment member, whereas the left-hand thread 20 can be threaded into a mating left-hand female thread in a hole 43 at the inner end of the attachment member 12.

With a chuck as described above, the tool 6 can be securely mounted in the chuck bore, on the one hand, by means of a clamping force from the hydraulic pressure acting on the tool shank 5 from the deflectable collet 7, and, on the other hand, can be prevented from being pulled out in the axial direction, as well as being rotated in one direction by means of the threaded connection between the tool shank 5 and the attachment member 12, which in its turn is prevented from being rotated in relation to the chuck body 1 by means of the splines connection 13, 14 between the attachment member 12 and the mounting portion 11 of the chuck body, as well as being prevented from being pulled out from the chuck body by means of the double-threaded regulating screw 16 interconnecting the attachment member 12 and the chuck body 1.

Furthermore, by means of the chuck, the projecting length of the tool 6 from the chuck body 1 can readily be regulated, such as is schematically illustrated in FIGS. 4a and 4b. More precisely, before clamping the tool shank 5 by applying a hydraulic pressure on the clamping collet 7, the projecting length can be regulated by rotating the regulating screw 16 by means of a tool, e.g. an Allen key 19, from the inner end of the chuck body. By rotating the Allen key in the direction as illustrated in FIG. 4a, the attachment member 12 can, due to the splines connection 13, 14, be drawn further into the mounting portion 11 of the chuck body, which will also draw the machining tool 6 further into the chuck bore 4. When, on the other hand, the Allen key 19 is rotated in the opposite direction, as illustrated in FIG. 4b, the attachment member 12 will be displaced outwards from the mounting portion 11 and the machining tool 6 will also be displaced outwards in relation to the chuck bore. When the correct projecting length of the machining tool has been obtained, a hydraulic pressure is applied to the clamping collet 7, which accordingly will clamp around the tool shank 5.

Figure 6:
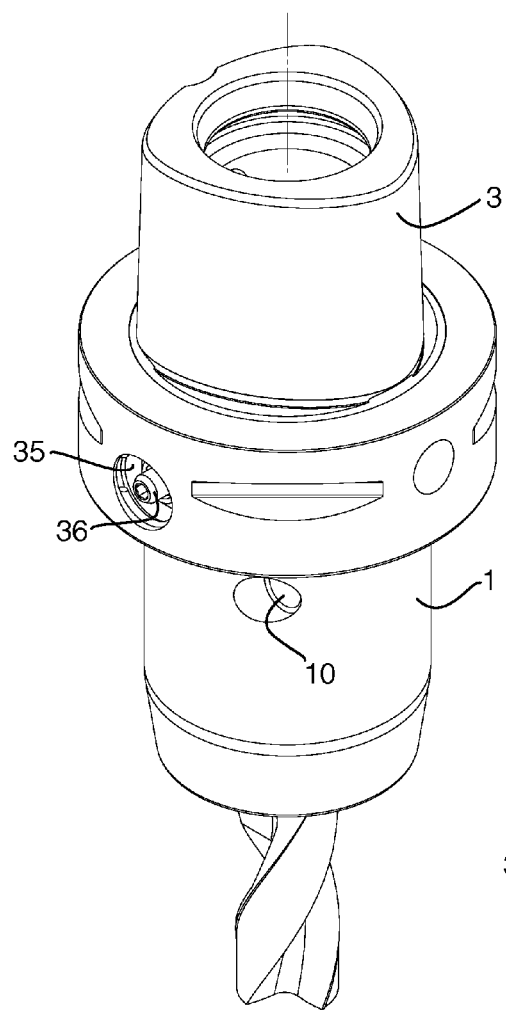
FIG. 6 is a perspective view of a chuck according to a second embodiment which carries a shank end mill.
Figure 7:
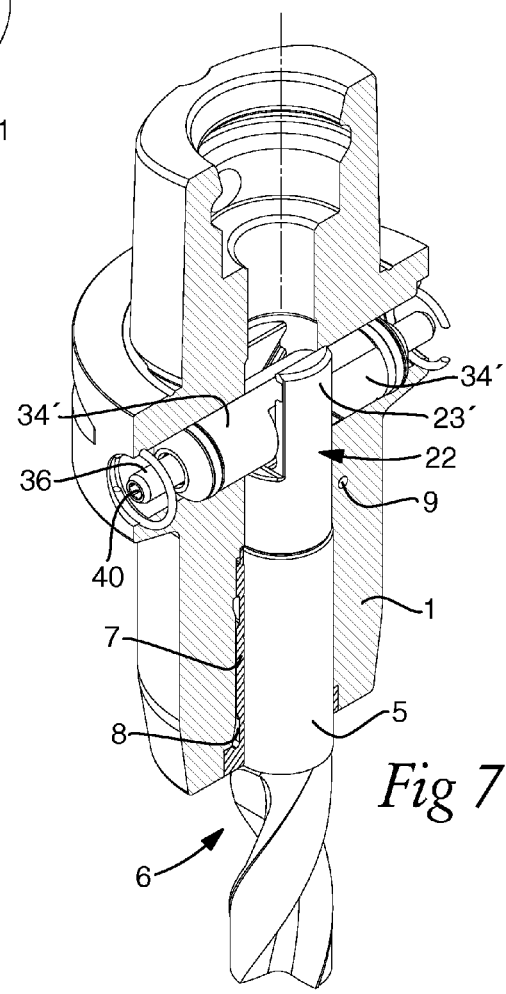
FIG. 7 is a perspective longitudinal cross-section of the chuck according to FIG. 6.
Figure 8:
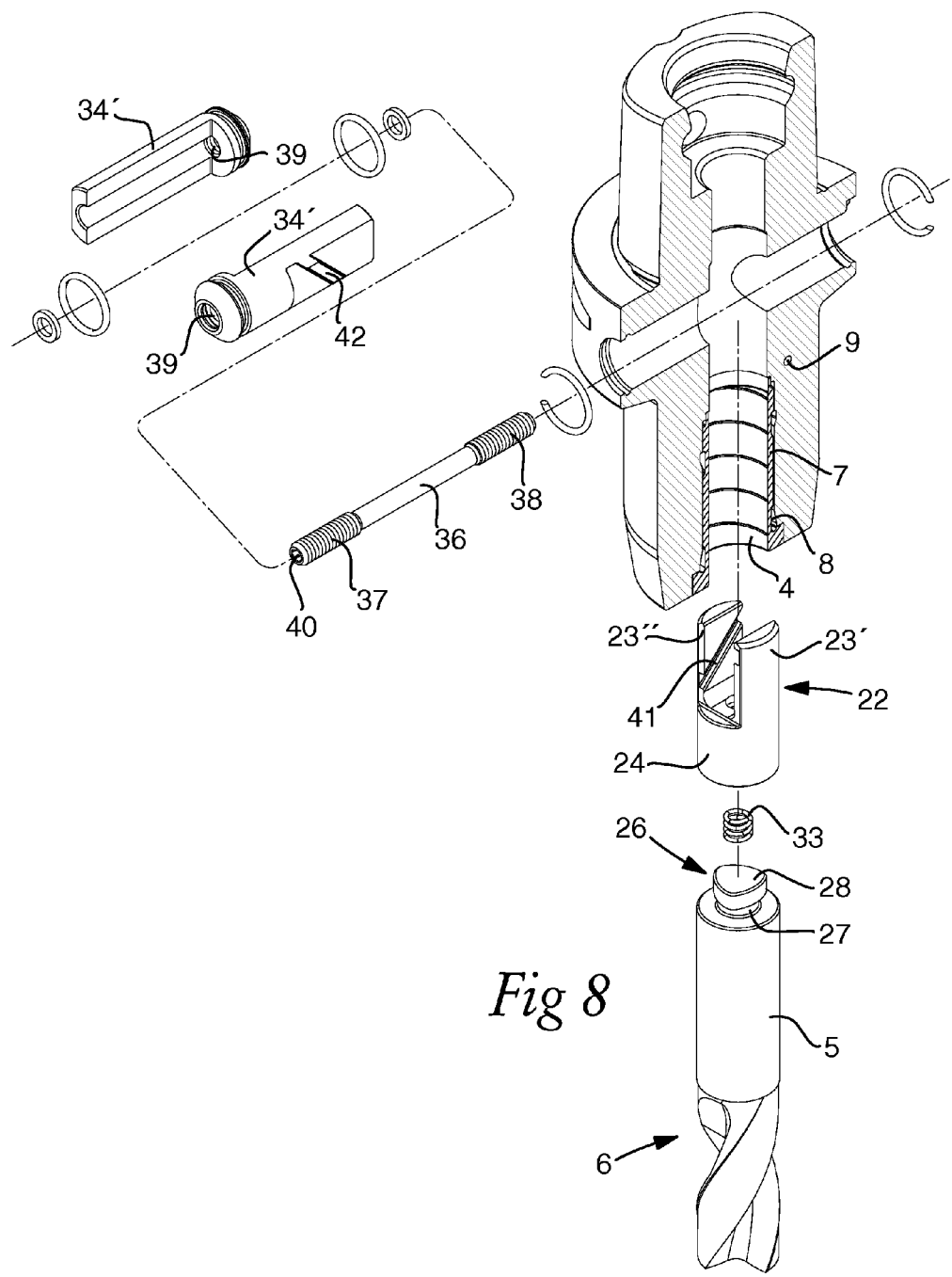
FIG. 8 is an exploded perspective view of the chuck in FIG. 7.

A second embodiment of the chuck, as illustrated in the FIGS. 6-13, has a similar outer appearance as the first embodiment which can be seen from FIG. 6. Accordingly, the chuck includes a general rotationally symmetric chuck body 1 of a generally homogenous metal material which is rotatable around a rotation axis 2. The chuck body is at one end formed with an attachment portion 3, which in the embodiments shown herein is in form of a tapered, non-circular shaft of a commonly known type, which is adapted to be secured to a mating motor-driven spindle of a working machine (not shown). In the opposite end the chuck body is provided with a circular cylindrical chuck bore 4, which is arranged to receive and clamp a shank 5 of a machining tool 6. A shank of a machining tool in form of a shank end mill is shown inserted into the chuck bore of the various drawings. Also, this chuck is of the kind, which clamps the tool shank by means of hydraulic pressure. For this purpose, the chuck is provided with a hydraulic clamping element in form of a rather thin-walled clamping collet 7 inserted into the chuck bore, as is best seen in FIGS. 9a and 9b. The clamping collet is identical with and functions in the same way as the clamping collet described in relation to the first embodiment.

However, the chuck according to this embodiment differs from the first embodiment in that the attachment member, the regulating mechanism of the attachment member and the connection between the tool shank and the attachment member are differently designed. Here, the attachment member has the overall shape of a yoke 22 having two yoke shanks 23, 23 projecting inward in the axial direction from a cylindrical base part 24 having a circular cross section and which in an outer end is provided with a female bayonet coupling part 25 mating with a male bayonet coupling part 26 in an inner end of the tool shank 5.

Figures 9A, 9B:
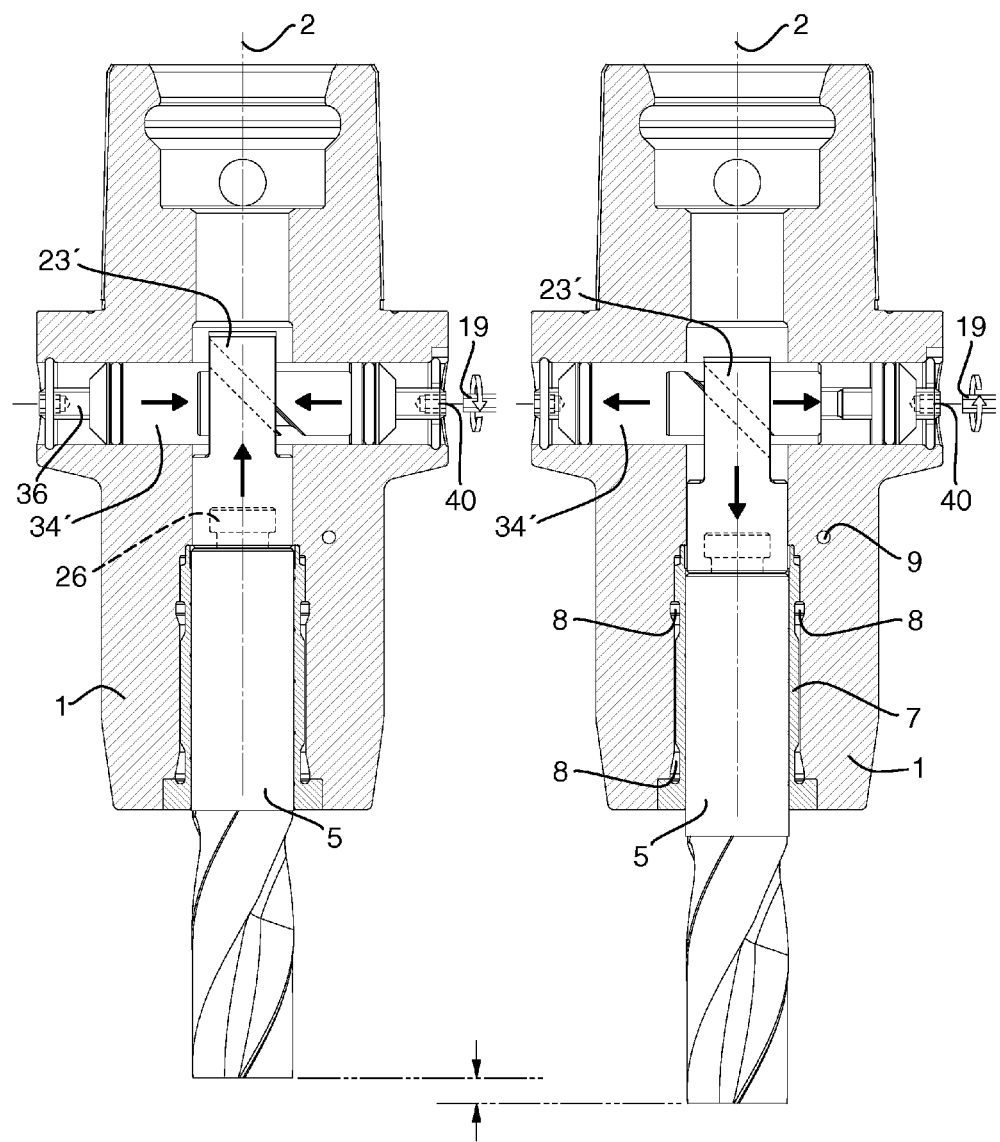
FIGS. 9a-9b are longitudinal cross-sections through the chuck of FIGS. 6-8 showing the shank end mill in two different projecting positions.
Figure 10:
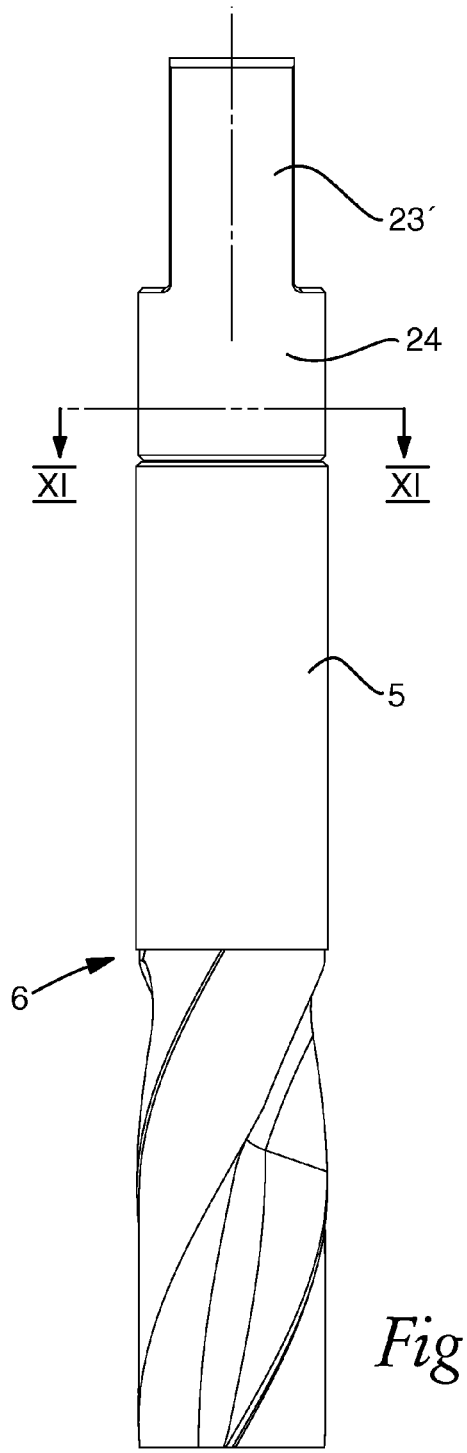
FIG. 10 is a view of the shank end mill and the attachment member in an assembled state.
Figure 11:
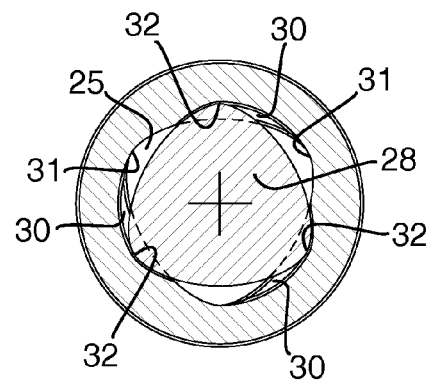
FIG. 11 is a cross-section taken along line XI-XI of FIG. 10 illustrating the bayonet coupling between the shank end mill and the attachment member.
Figure 12:
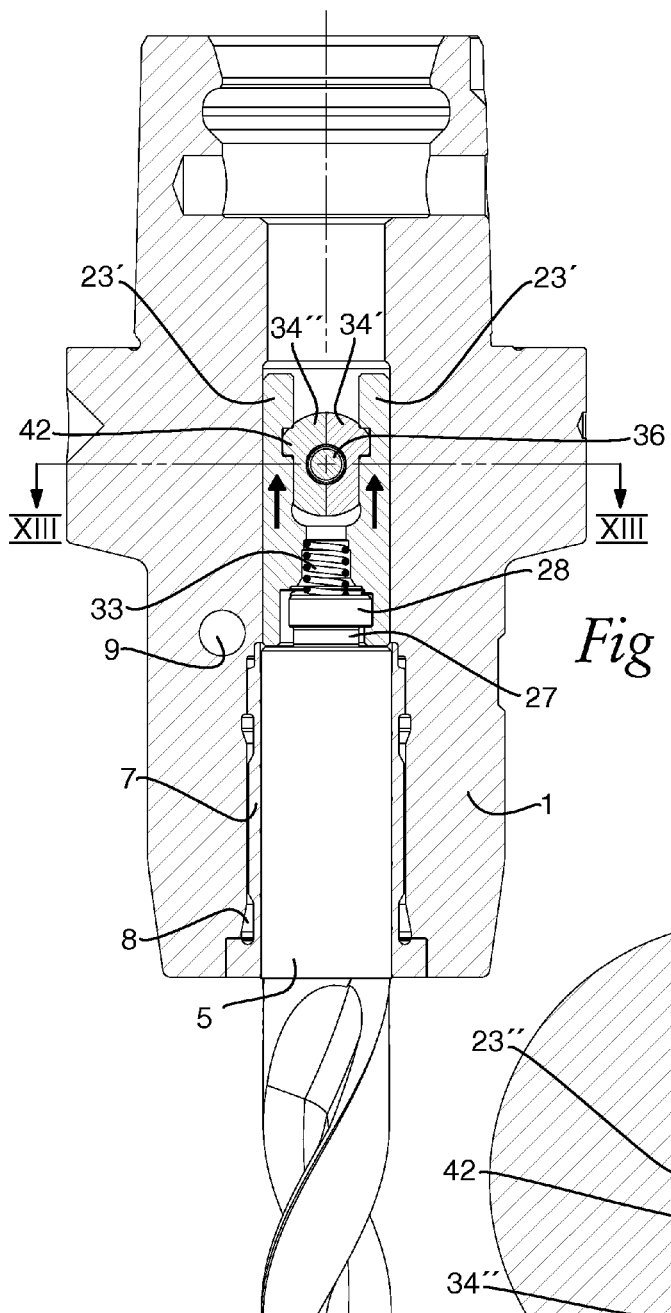
FIG. 12 is a longitudinal cross-section through the chuck body and attachment member illustrating the bayonet coupling between the shank end mill and the attachment member, as well as the combined pull out preventing means and the projection regulating mechanism for the shank end mill.
Figure 13:
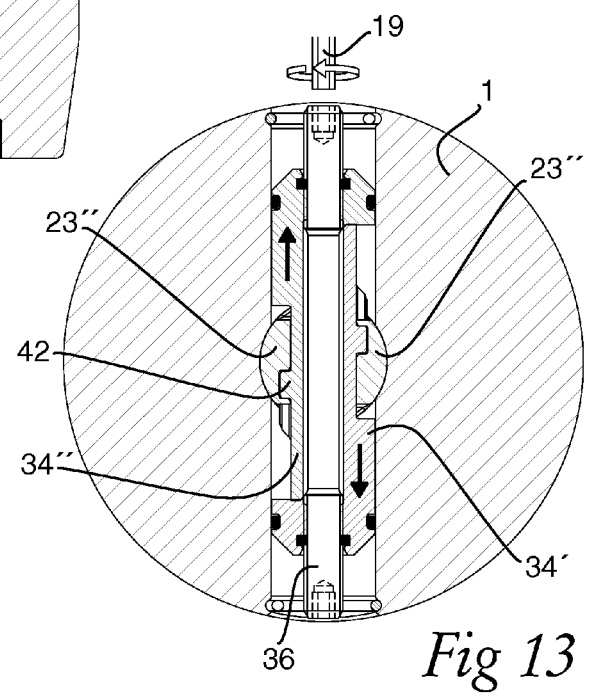
FIG. 13 is a cross-section taken along line XIII-XIII in FIG. 12 illustrating the projection regulating mechanism for the shank end mill.

The bayonet coupling 25, 26 is illustrated in more detail in FIG. 11, which is a cross section along the line XI-XI in FIG. 10 which shows the attachment member 22 and the machining tool 6 in an assembled state. As evident from FIG. 11 in combination with FIGS. 9a and 9b, the male bayonet coupling part 26 of the tool is formed with a shank portion 27 having a circular cross-section closest to the tool shank, and an inner head portion 28 having a somewhat triangular shape. The female bayonet coupling part 25 has a somewhat triangular inlet opening closest to the outer end of the attachment member 22, through which the triangular head 28 of the male bayonet coupling part 26 may pass.

Inward from the triangular inlet opening, the female bayonet coupling part 25 is formed with recesses 30 in the areas between the apexes 31 of the triangular inlet opening, such that when the triangular head 28 of the male bayonet coupling part 26 has passed the triangular inlet opening of the female bayonet coupling part, the male and female bayonet coupling parts can engage with each other by a further minor rotation of the tool shank 5 in relation to the attachment member 22 to the position as illustrated in FIG. 11. In this position the apexes 32 of the triangular head 28 of the male bayonet coupling part 26 will be locked in the recesses 30 against pull-out in the axial direction, as well as against rotation in one direction. As is evident from FIG. 12, the chuck is also provided with a spring 33 in the inner end of the female bayonet coupling part 25 acting to press the male bayonet coupling part 26 and accordingly also the machining tool 6 in an axial direction outward.

With reference to the FIGS. 7, 8, 9a, 9b, 12 and 13, hereinafter follows a description of the pull out and rotary preventing means for the attachment member 22, as well as of the mechanism for regulating the axial projecting length of the machining tool 6 from the chuck. As is evident from the drawings, two locking rods 34, 34 are accommodated in a hole 35 transverse to the axial direction of the chuck and are extended through the space between the yoke shanks 23, 23 and partly overlap each other. The locking rods are adjustably telescoping interconnected by means of a regulating rod 36 having one right-hand thread 37 and one left-hand thread 38. The regulating rod is extended through and in threaded engagement with a hole 39 in each of the locking rods, such that when rotating the regulating rod 36 in one direction by means of a suitable tool, such as by e.g. an Allen key 19 in engagement with an Allen aperture 40 in one of the ends of the regulating rod, the locking rods 34, 34 will be displaced in a direction apart from each other, and when rotating the regulating rod in the other direction, the locking rods will be displaced in a direction towards each other. Moreover, the yoke shanks 23, 23 are in the inner surfaces facing each other, provided with diagonally oppositely directed grooves 41, and the locking rods are provided with guide surfaces which, in the assembled state of the mechanism, are facing in opposite directions and are provided with diagonally oppositely directed ridges 42.

In the assembled state of the mechanism, the diagonally oppositely directed grooves 41 of the yoke shanks and the diagonally oppositely directed ridges 42 of the locking rods are in engagement with each other such that pull out of the attachment member in the axial direction, and hence also the machining tool, is prevented. Since the attachment member 22 is formed as a yoke and the locking rods extends through intermediate space between the two yoke shanks, the attachment member will also be prevented from rotation in both directions.

FIGS. 9a and 9b illustrate the procedure for regulating the projecting length of the machining tool 6 from the chuck. When rotating the regulating rod 36 in one direction by means of an Allen key 19, as is illustrated in FIG. 9a, the locking rods 34, 34 will be synchronously displaced in a direction towards each other. Accordingly, the engagement between the diagonally oppositely directed ridges 42 of the locking rods and the diagonally oppositely directed grooves 41 of the yoke shanks 23, 23 will cause a retraction of the attachment member 22, and hence also the machining tool 6 into the chuck. When, on the other hand, the regulating rod 36 is rotated in the opposite direction, as is illustrated in FIG. 9b, the attachment member and the machining tool will be synchronously displaced in a direction outward from the chuck. The synchronous displacement of the locking rods is advantageous since the dynamic balance of the chuck will be maintained regardless of the projecting length of the machining tool. It is also advantageous to be able to regulate the projecting length of the machining tool from a direction transverse to the rotary axis of the chuck, since it is possible to regulate the projecting length while the chuck is mounted in the machine. With a chuck according to the first embodiment it is necessary to first remove the chuck from the machine before performing the regulating.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A rotatable chuck for clamping a shank portion of a rotatably operating machining tool, the rotatable chuck comprising:
   a rotatable chuck body provided with a cylindrical bore concentric with a rotation axis of the rotatable chuck body;

a clamping portion disposed in the bore, wherein circumferential surfaces of the clamping portion are arranged to apply a clamping force around a circumference of the shank portion of the tool when it is mounted in the chuck to fixate the tool in the chuck;

an attachment member axially movable in an inner portion of the bore and being attachable to the shank portion of the tool to be clamped by a threaded connection, such that the tool and the attachment member will be prevented from being pulled apart in the axial direction, as well as preventing inadvertent rotation of the tool in at least one direction in relation to the chuck during machining operation, wherein the attachment member is sleeve-shaped and includes an envelope surface formed with splines having grooves and ridges in the axial direction, which are arranged to engage with mating splines disposed at a mounting portion of the chuck body; and an axial pull out preventing device interconnecting the attachment member and the chuck body, wherein the axial position of the attachment member is continuously adjustably displaceable and lockable in different positions within the chuck body.

2. The chuck according to claim 1, wherein the attachment member is provided with a threaded hole in its inner end and the chuck body is provided with a threaded hole inward of the mounting portion, the axial pull out preventing device being a screw received in both the threaded holes of the attachment member and the chuck body such that the attachment member is attachable to the chuck body by means of the screw.

3. The chuck according to claim 2, wherein the screw is a regulating screw which can be utilized to regulate an axial position of the attachment member inside the chuck body and a projecting length of the machining tool from the chuck body.

4. The chuck according to claim 3, wherein the regulating screw is formed with one right-hand thread and one left-hand thread.

5. The chuck according to claim 1, wherein the attachment member is provided with a male or female thread in its outer end arranged to engage with a mating thread at the inner end of the tool shank.

6. The chuck according to claim 5, wherein the thread is conical shaped.

* * * * *